United States Patent [19]

Wardle

[11] 4,158,189

[45] Jun. 12, 1979

[54] BAFFLED BLANKET ACOUSTIC ARRAY INCORPORATING AN INDENTED REACTION PLATE

[75] Inventor: William F. Wardle, Mystic, Conn.

[73] Assignee: The United States of America as represented by the Secretary of the Navy, Washington, D.C.

[21] Appl. No.: 906,164

[22] Filed: May 15, 1978

Related U.S. Application Data

[62] Division of Ser. No. 825,325, Aug. 17, 1977, Pat. No. 4,140,992.

[51] Int. Cl.² ................... H04B 13/00; H04B 11/00
[52] U.S. Cl. ......................................... 340/9; 340/85
[58] Field of Search ............... 340/8 R, 8 PC, 8 MM, 340/8 S, 9, 10, 11, 12, 13

[56] References Cited

U.S. PATENT DOCUMENTS

| | | | |
|---|---|---|---|
| 2,961,636 | 11/1960 | Benecke | 340/9 |
| 3,409,869 | 11/1968 | McCool et al. | 340/9 |
| 3,737,004 | 6/1973 | Higgs | 340/8 S |
| 3,907,062 | 9/1975 | Brigham | 340/8 S |
| 3,979,711 | 9/1976 | Maginness et al. | 340/9 |

*Primary Examiner*—Harold J. Tudor
*Attorney, Agent, or Firm*—Richard S. Sciascia; Arthur A. McGill; Prithvi C. Lall

[57] ABSTRACT

A baffled conformal blanket sonar array utilizes a corrugated or indented reaction plate and a sound isolation baffle of non-uniform thickness. A plurality of compliant tubes embedded in an elastomer on the interior side of the reaction plate permit the baffle's sound isolation function to remain constant in areas of differing baffle thickness. Sensors, associated components, cabling, etc. are embedded in an elastomer which fills the corrugations or indents on the exterior side of the reaction plate. An elastomer sheet covering forms a smooth even external surface. The result is an array which is thinner, lighter and more damage resistant than existing arrays.

6 Claims, 4 Drawing Figures

BAFFLED BLANKET ACOUSTIC ARRAY INCORPORATING AN INDENTED REACTION PLATE

STATEMENT OF GOVERNMENT INTEREST

The invention described herein may be manufactured and used by or for the Government of the United States of America for governmental purposes without the payment of any royalties thereon or therefor.

This application is a division of application Ser. No. 825,325 filed Aug. 17, 1977, now U.S. Pat. No. 4,140,922 for An Improved Baffled Blanket Acoustic Array.

BACKGROUND OF THE INVENTION

Prior art conformal blanket sonar arrays include arrangements having three distinctly different flat uniform layers adhered to one another in sandwich fashion. The three layers comprise a sound isolation baffle adhered to an exterior hull surface, a reaction plate adhered to the sound isolation baffle and a layer embedding sonar components adhered to the reaction plate. The reason for interjecting the reaction plate into this configuration involves the incompatibility between the relatively low acoustic impedance exhibited by a sound isolation baffle and the relatively high impedance environment required by acoustic sensors. The reaction plate being of sufficient mass and stiffness tends to solve this problem by permitting substantially different impedance environments to exist on either side of itself.

A requirement of conformal blanket sonar arrays is that they be made sufficiently thin and lightweight so as to permit installation over a vessel's exterior hull surface without seriously affecting the vessel's handling, stability, speed, endurance, etc. However, the tendency is to propose additions to such arrays, such as the addition of the aforementioned baffle and plate, with the objective of improving sonar performance but with an undesirable increase in thickness and weight thus hindering the vessel's sea performance and thereby partially negating one of the most desirable features of such arrays.

The packing efficiency of each layer must be considered. The layer embedding sonar components in some arrays exhibit a low packing density particularly along dimensions where self-noise is correlated over relatively large distances. Conversely, it is expected that a sound isolation layer of uniform thickness and a flat reaction plate will contain little or no unused volume.

Another drawback of the prior art involves the flexibility inherent in a flat plate. The flat reaction plate tends to lack stiffness and therefore is limited in its ability to spread the effect of its mass over relatively large areas.

SUMMARY OF THE INVENTION

Accordingly, it is a general purpose and object of the present invention to provide an improved baffled blanket sonar array. It is a further object that the array can better achieve the same qualities of quietness, sensitivity, directionality and other desirable performance criteria as existing arrays with reduced thickness and weight. This will improve the speed, maneuverability, handling, etc. of the vessel carrying the array. Another objective is to increase the resistance of the array to physical damage.

It is a further objective to create a sound isolation baffle that exhibits a uniform sound isolation function over its surface dimensions but which is non-uniform thickness. Still another objective is to maintain sufficient rigidity and strength in the complete array so that hydrodynamic drag or other forces do not deform or damage the array but where the complete array retains the flexibility needed for mounting on a curved surface.

Another objective is to provide a relatively large thickness of elastomer in which sensors are embedded. A large thickness will allow the sensors to be adequately separated from both a reaction plate and exterior array surface. Separation from the reaction plate improves sensor sensitivity and separation from the exterior surface minimizes self-noise problems.

These objects of the invention and the various features and details of construction and operation will become apparent from the following description and drawings.

The above objective are accomplished by utilizing a corrugated or indented reaction plate and positioning sonar sensors and associated components and cabling within the corrugations or indents in such a plate. These sensors, components, and cabling are further embedded in an elastomer which completes the filling of the corrugations or indents and covers the reaction plate with a smooth low drag surface. The elastomer is adhered to the reaction plate with adhesives or other means. The corrugated or indented reaction plate is similarly adhered to a complementary shaped sound isolation baffle which is in turn similarly adhered to an exterior hull surface.

The uniform sound isolation is achieved by having the thin baffle sections under the corrugations or indents achieve the same sound isolation as the thicker baffle sections by utilizing less rigid sound isolation components. These thin less rigid areas are bridged by the stiff corrugated or indented areas in the reaction plate. Since these thin sections in the sound isolation baffle will tend to be more compressible than the thicker sections, means are provided to create a pressure barrier encompassing each such area. As with existing arrays the edges of the array are faired into the exterior hull surface so as to minimize drag and noise.

DESCRIPTION OF THE PREFERRED EMBODIMENT

Figures 1, 2, 3, 4:
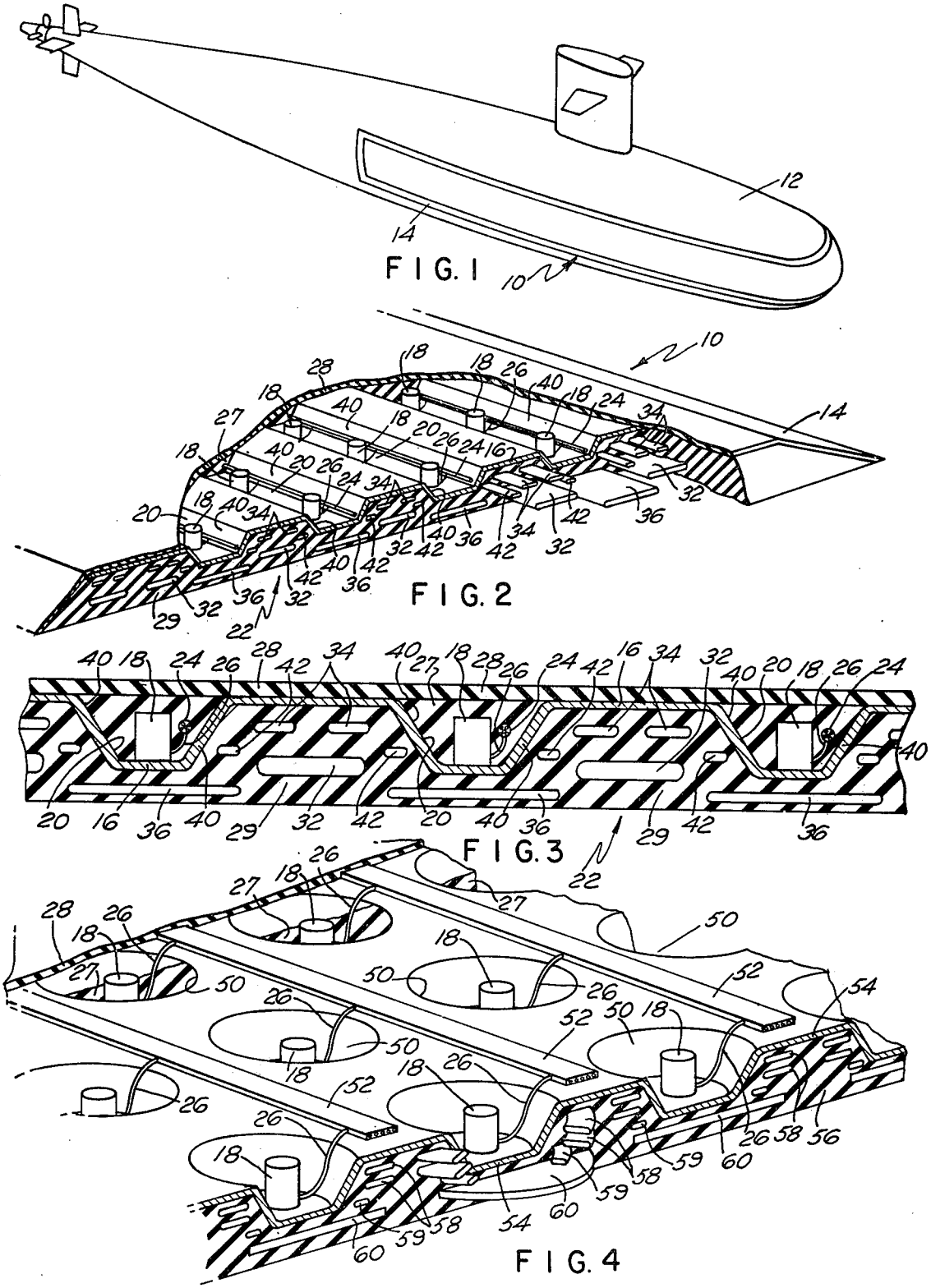
FIG. 1 is a perspective view of a baffled blanket sonar array installed on an exterior hull surface.
FIG. 2 is a perspective view, partially in section, showing the position of components within the array of FIG. 1.
FIG. 3 is a detailed sectional view of the array of FIG. 1 with the emphasis on the delineation of various array segments.
FIG. 4 is a perspective view, partially in section, of an alternate embodiment of the array of FIG. 1.

Referring to the drawings there is shown in FIG. 1 a conformal blanket hydrophone sonar array 10 including an integrated acoustic baffle installed on a submarine's exterior surface 12 by adhesives or other means. A fairing 14 similarly attached about all edges of the array 10 serving to reduce drag and flow noise. Fairing 14 can be fabricated as an integral part of array 10 with adhesives or other means. Array 10 can comprise either a single section or a plurality of individual staves with adjacent edges abutting one another.

Referring now to FIG. 2 there is shown an enlarged cutaway view of the array 10. A principle feature is the corrugated reaction plate 16 which serves a number of purposes but whose main function is to provide the mass and stiffness required between the acoustic sensors 18 and the acoustic baffle 22. The sensors 18 are positioned in grooves 20 on the exterior side of plate 16. The acoustic baffle 22 is located on the interior side of plate 16, between the exterior hull surface of the submarine 12 of FIG. 1 and the plate 16. The baffle 22 and the plate 16 extend beyond the area populated with sensors 18 so as to help reduce that portion of the acoustic interference that follows paths around the baffle's 22 edges.

The acoustic sensors 18 which may incorporate preamplifiers and data telemetry circuits are connected to data cables 24 by means of stub cables 26. The sensors 18, cables 24, 26 and any other components which may be required are embedded in an elastomer 27 which fills grooves 20. Elastomer 27 is removed from portions of FIG. 2 for clarity. Elastomer 27 adheres to the exterior surfaces of the plate 16 that forms the walls of grooves 20. Adhesives or other means are employed to form this bond. The elastomer 27 fills grooves 20 to the top of plate 16. A smooth uniform elastomer sheet 28 is attached to elastomer 27 and plate 16 with adhesives. The sheet 28 serves to both protect the underlying parts and to provide a smooth low drag surface. Depending on various fabricating and functional considerations the elastomer sheet 28 may also be formed of and be integral with the elastomer filling grooves 20.

The acoustic baffle 22 is comprised of various acoustically reactive components, cavities, etc. embedded in an elastomer 29. Whereas other types of reactive components may be employed, the particular embodiment shown utilizes compliant tubes 32, 34, 36 and 42. It is noted that compliant tube baffles have been previously developed. The specifications for the compliant tubes 32, 34, 36 and 42, as well as their replacement and orientation will follow accepted practice in the field.

Referring to FIG. 3, which is a sectional view of the subject baffled array 10, various features and functions will be described. It is to be noted that baffle 22 is much thinner under sensors 18 than in the intervening spaces. However, it is required that the baffling function be as uniform as possible over all parts of the baffle 22. This requirement is met by designing what might be considered a normal baffle in the thick sections with compliant tubes 32 and 34 respectively providing a low and high frequency response function. The baffle 22 in the thicker sections will be comprised of compliant tubes of normal rigidity and other characteristics and be capable of sustaining static pressures significantly higher than those pressures in the surrounding water medium. To accomplish the same degree of sound isolation in the thin sections it is required to utilize compliant tubes 36 of high resiliency. The tubes 36 cannot sustain high ambient pressures and still function.

In order to reduce the static pressure in the thin portions of the baffle 22, a wedge shaped transitional zone is established in the baffle by means of the sloping sides 40 of plate 16. Compliant tubes 42 are installed in the transition zone to provide both an acoustic reactive function and to enhance the wedging action's creation of a static pressure gradient. Fillers, spacers, etc. can be used to improve performance. The plate 16 is stiff and strong enough to resist deflecting inward a significant amount in the vicinity of the thin baffle sections. The wedge angle, the size, number and placement of components in the wedge is chosen so as to maintain as uniform an acoustic baffling function as possible while at the same time sustaining the pressure differential between the thick and thin portions of baffle 22.

The foregoing description of the invention utilizes a corrugated reaction plate 16. Although a corrugated geometry facilitates the installation of sensor 18, cabling 24, 26 and linear baffle components, it should be noted that an indented reaction plate 54 as shown in FIG. 4 is a viable alternative. In such a configuration a sensor 18 or sensors and associated components would be located within each indent 50. Flat cabling 52 could be embedded in a thin elastomer layer covering the flat area at the top of the reaction plate 54. Whereas the same wedge type transition zone would be established within the portion of the baffle 56 surrounding each indent 50 it can be enhanced by ring tubes 59 installed within the pressure transition zone with the material of these rings or cylinders 59 in a compression mode to resist the differential pressures in the baffle 56. Whereas linearly and/or circularly configured compliant tubes can be used with the indented reaction plate 54, FIG. 4 shows circularly configured compliant tubes 58. Also, compliant tube 36 of FIG. 3 has been replaced with compliant hollow pancaked shaped component 60.

Another variation, not shown, employs cylindrical shells completely surrounding each thin baffle area; such cylindrical sheels sustain the total pressure differential between the thick and thin baffle areas.

There has therefore been described an improved sonar array and acoustic baffling system. In the improved system the thickness and weight of a blanket array and baffle combination is reduced without sacrificing the acoustic performance of the array. The corrugations or indents will tend to acoustically stiffen the reaction plate thus improving its performance. A corrugated plate will tend to be stiffer in one direction than another but this characteristic can be exploited since the spatial correlation of self-noise and signal can also exhibit directional characteristics. The various sonar array components mounted within the corrugations or indents will be protected to some extent from damage due to the arrays contact with various objects including personnel walking on the array, contact with waterborne debris, docking forces, etc. The corrugations or indents will help strengthen the reaction plate and thus improve its ability to protect components located on its interior side. The corrugations or indents provide a larger surface for adhesives and will tend to help lock the elastomers to the reaction plate. This latter advantage might be further enhanced by grooves or indents especially designed to facilitate this locking function.

Although conventional compliant tubes have been used in the present invention, it should be noted that modified compliant tubes containing springs, limit blocks, gas pressure compensation means, etc. can be employed. In addition other types of baffle components including flexible gas and liquid filled tubes, cavities and bubbles in elastomer sheets, weighted shot and weighted elastomers, gas pressure compensation devices, devices incorporating springs and other resilient parts, etc. can be employed.

It should be noted that it is possible to mount sensor elements that are sensitive to frequencies below those that are affected by the acoustic baffle between the reaction plate and submarine hull, that is above, in, or below the baffle so long as such sensors do not adversely affect other required array performance.

An array and baffle combination may or may not be divided into staves for strips. However, such a division will facilitate the conforming of the array and baffle combination to complex hull surface contours. The corrugated or indented reaction plate unless segmented can only flex like a stiff tape. If necessary, the width of the staves or strips can be varied along their length so as to permit the fitting together of such staves or strips on a complex surface. If the reaction plate is segmented, the segments can be abutted to one another, overlapped like shingles, or their edges otherwise joined to preserve the function of the reaction plate uninterrupted through the joint.

It should be also noted that the subject array and baffle combination can be installed on vessels and bodies other than a submarine and over, within, or inside surfaces other than a vessel's exterior hull surface. For example, such installations might be on the exterior or interior surface or within a sonar window. Such a window might comprise a sonar dome or sonar chest cover. Also such an array and baffle can be installed on any surface or suspended within a sonar dome or chest and the same geometry and justaposition of components positioned by means other than in an elastomer. Also the various components may be separated in the manner and position of the location for example the sensors might be on the exterior surface of a sonar window, the reaction plate might be integrated within the structure of the window and the acoustic baffle located on the interior surface of the window. Of course, in the foregoing example, only frequencies not affected by the array and baffle combination could be detected within the volume enclosed by the window. There are obviously many combinations of locations including reverse juxtapositions of components.

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. A baffled blanket acoustic array system comprising:
    an indented reaction plate having a plurality of indentations having a circular cross-section;
    an acoustic array including a first compliant material located on one side of said indented reaction plate and an array of acoustic transducers embedded in said first compliant material each of said transducers being located in one of said indentations; and
    an acoustic baffle including a second compliant material located on the other side of said reaction plate and a plurality of acoustically reactive baffle components embedded in said second compliant material.

2. A baffle blanket acoustic array system according to claim 1 wherein said first compliant material has a plurality of thicker and thinner portions and said acoustic transducers are located within said plurality of thicker portions.

3. A baffled blanket acoustic array system according to claim 2 wherein said second compliant material has a plurality of thicker and thinner portions containing said acoustically reactive baffle component, said acoustically reactive baffle components in said thinner portions being more compliant than in said thicker portions.

4. A baffled blacket acoustic array system according to claim 3 wherein said indented reaction plate further comprises a plurality of sloping walls having means for containing a portion of said second compliant material in a wedge shaped section that serves to restrict the transmission of ambient pressure to said thinner portions of said acoustic baffle.

5. A baffled blanket acoustic array system accordin to claim 4 wherein said array of acoustic transducers has interconnecting ribbon cables.

6. A baffled blanket acoustic array system according to claim 5 further comprising an elastomer sheet covering said acoustic array.

* * * * *